No. 770,796. PATENTED SEPT. 27, 1904.
H. F. CAMPBELL.
APPARATUS FOR SEPARATING ORE.
APPLICATION FILED MAY 16, 1901.
NO MODEL. 5 SHEETS—SHEET 1.

Witnesses:
E. Batchelder
George Pizzetta

Inventor,
Henry F. Campbell
by Wright Brown Quinby
Attys.

No. 770,796. PATENTED SEPT. 27, 1904.
H. F. CAMPBELL.
APPARATUS FOR SEPARATING ORE.
APPLICATION FILED MAY 16, 1901.
NO MODEL. 5 SHEETS—SHEET 4.

Witnesses: E. Batchelder, George Pizzetti.

Inventor: Henry F. Campbell
by Wright Brown & Quimby, attys.

No. 770,796. PATENTED SEPT. 27, 1904.
H. F. CAMPBELL.
APPARATUS FOR SEPARATING ORE.
APPLICATION FILED MAY 16, 1901.
NO MODEL. 5 SHEETS—SHEET 5.

No. 770,796. Patented September 27, 1904.

UNITED STATES PATENT OFFICE.

HENRY F. CAMPBELL, OF BOSTON, MASSACHUSETTS, ASSIGNOR, BY DIRECT AND MESNE ASSIGNMENTS, TO NATIONAL MAGNETIC MINERAL SEPARATING COMPANY, A CORPORATION OF MAINE.

APPARATUS FOR SEPARATING ORE.

SPECIFICATION forming part of Letters Patent No. 770,796, dated September 27, 1904.

Application filed May 16, 1901. Serial No. 60,433. (No model.)

*To all whom it may concern:*

Be it known that I, HENRY F. CAMPBELL, of Boston, in the county of Suffolk and State of Massachusetts, have invented certain new and useful Improvements in Apparatus for Separating Ore, of which the following is a specification.

This invention relates to a new and useful method and apparatus for the extraction of magnetic particles from ore-pulp.

Reference is to be had to the accompanying drawings, forming a part of this application, wherein like characters are used to indicate like parts wherever they occur.

Fig. 3 represents a longitudinal sectional view thereof, showing the relative arrangement of the parts, the latter appearing relatively as in Fig. 1. In this view in succession appear the apron of the agitator, the first distributer and its magnet, the second distributer and its magnet, and the third distributer and its magnet, all the distributers and the first and second magnets appearing above the tray and the third or horseshoe-magnet having one of its poles above the tray and the other below, each pole of the latter magnet being shown as adjustable and the first two magnets being adjustable toward and from the tray.

The framework of the apparatus may be of any desired construction and is here shown as composed of a base 1, uprights 2, side pieces 3, braces 4, and a side bracket 5.

6 represents a motor mounted on the base 1, by which the movable parts of the apparatus are driven.

7 represents standards mounted on the base 1, in which are mounted a shaft 8, upon which are rigidly mounted two pulleys 9 10. (See Fig. 1.) A belt 11 (see Fig. 2) runs from pulley 12 on the shaft of the motor to the pulley 10, whereby motion is imparted to the shaft 8 and the pulley 9.

13 represents a shaft mounted in bearings carried by brackets 13ª, secured to the uprights 2. (See Figs. 1, 2, 3, 4, and 6.)

14 represents a belt running from the pulley 9 to a pulley 15, fast on the shaft 13, whereby movement is imparted to said shaft and the parts driven thereby.

16 represents a shaft mounted in suitable bearings on the bracket 5.

17 represents a belt running from a pulley 18, fast on shaft 8, to a pulley 19, fast on the shaft 16, whereby motion is imparted to said shaft. (See Figs. 1, 2, and 4.)

Beginning at the front end of the apparatus, (see Figs. 1 and 2,) 20 21 22 represent three pulleys fast on the shaft 16.

23 (see Figs. 2 and 4) represents brackets secured to the framework on the opposite side of the latter from the brackets 5.

24 represents a shaft mounted in suitable bearings on the brackets 23.

Beginning at the front end of the apparatus, (see Figs. 2 and 3,) $20^a$ $21^a$ $22^a$ represent three pulleys fast on the shaft 24, opposite, respectively, pulleys 20 21 22.

$20^b$ represents a belt of any suitable material to serve as a carrier, as hereinafter described, said belt running from the pulley 20 on the shaft 16 to the pulley $20^a$ on the shaft 24. $21^b$ represents a like belt connecting the pulleys 21 and $21^a$. $22^b$ represents a like belt connecting the pulleys 22 and $22^a$. The direction of drive of the belt 17 is such that the belts $20^b$ $21^b$ $22^b$, hereinafter referred to as "carriers," are all driven in the direction of the arrows, (see Figs. 2 and 4,) but one of the carriers appearing in the last-mentioned figure—to wit, $20^b$—and said carrier appearing partly in section, the carrier $22^b$ not appearing in this figure and the carrier $21^b$ being omitted.

25 represents a hopper, supported at its outer edge by hangers 26, connected to the end of the bracket 5 and supported on its inner side by a framework in any suitable way. This hopper, as shown, is arranged under the carriers $20^b$ $21^b$ $22^b$, between the uprights 2 and the ends of the brackets 5, and also under the pulleys 20 21 22.

27 represents brushes carried by the bracket 5 and engaging the carriers $20^b$ $21^b$ $22^b$ upon the pulleys 20 21 22, over the hopper 25, there being a brush 27 for each carrier. (See Fig. 2.)

28 represents a hopper supported in a suitable way (not shown) and located at the lower rear end of the apparatus. (See Figs. 1, 2, and 3.)

29 represents two elbow-spouts delivering into the hopper 28, said spouts at their ends being arranged beneath the free and rear end of the tray hereinafter described in the form of a gutter $29^a$.

30 represents a bracket carried by a crosspiece at the upper front end of the apparatus. (See Figs. 1, 2, and 3.)

31 represents a spider pivoted at its outer end by a bolt 32 to the end of the bracket 30.

33 represents a tray connected at its front end to and supported by the rear and lower end of the spider 31. (See Figs. 1, 2, and 3.) This tray is formed with the side pieces or flanges 34 and with an end piece or flange 35 at its upper end in order to prevent the material being shaken off the tray. The bottom of the tray 33 is preferably composed of alumina or an aluminium surface carried upon some light structure, such as laminated wood, the purpose being to have the tray as light as possible and yet present a surface of non-magnetic material upon which the material rests in its passage down the tray. The tray at its lower end is supported by links 36, (see Figs. 1, 3, and 6,) said links being pivoted at their upper ends to lugs 37, carried by the bottom of the tray, and at their lower ends to lugs 38, secured to a cross-piece 39, carried by the uprights 2. (See Fig. 3.) The particular arrangement of the links 36 and their connections may be varied and other devices may be employed in their place, their purpose being to support the lower end of the tray in such a manner as to permit its reciprocation with as little friction as practicable.

40 represents a pitman pivoted at one end to a lug 41, secured to the under side of the tray 33 at its lower end. The pitman 40 at its opposite end is pivoted to a crank 42 on the rear end of the shaft 13. (See Figs. 3 and 5.) By this construction the tray 33 is vibrated about the pivot 32 as a center.

43 represents a lug secured to one of the side pieces or flanges 34 of the tray 33 between the pulleys 21 and 22. (See Figs. 1 and 2.)

44 represents an arm secured to the under side of the bracket 5 and projecting downward. (See Fig. 2.)

Figures 8, 9, 10, 13:
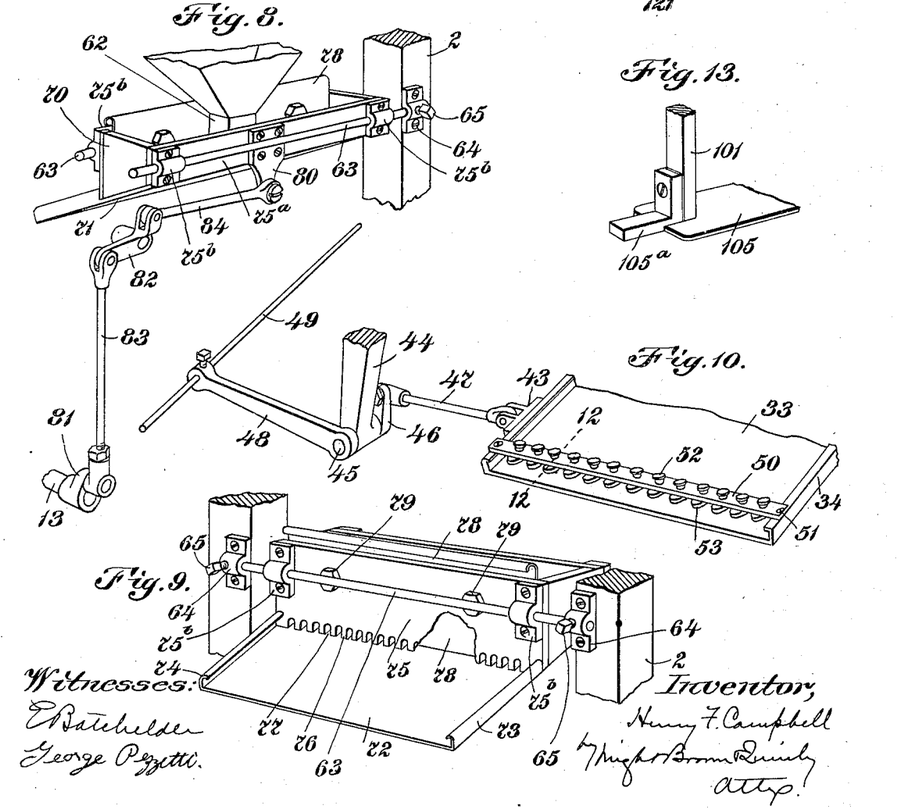
Fig. 8 is a detail perspective view showing the lower part of the hopper, the agitator, and the means for vibrating the latter, the parts appearing as seen from the left side of the apparatus. (See Fig. 2.)
Fig. 9 is a detail perspective view of the parts shown in Fig. 8 looking toward the front of the apparatus (see Figs. 1 and 3) or looking at the opposite side of the parts from what they appear in Fig. 8.
Fig. 10 is a detail perspective view of the striker and its attachment to the tray, this view also showing the adjustable shutters of the distributer.
Fig. 13 is a detail perspective view of the extension-piece of the magnet 100.

45 represents a shaft mounted in the lower end of the arm 44. 46 represents a crank fast upon one end of said shaft. (See Fig. 10.)

47 represents a pitman pivoted at one end to the lug 43 and at its opposite end to the end of the crank 46.

48 represents an arm fast on the opposite end of the shaft 45 and carrying at its free end a rod 49, arranged over and in close proximity to the carriers $20^b$ $21^b$ $22^b$, directly over the hopper 25. (See Fig. 2.) The arrangement is such that as the tray 33 is vibrated by the pitman 40 a rocking motion is given to the shaft 45 and the rod 49 caused to deliver rapid blows of predetermined intensity upon the upper or top side of the carriers over the hopper 25.

Figures 11, 12:
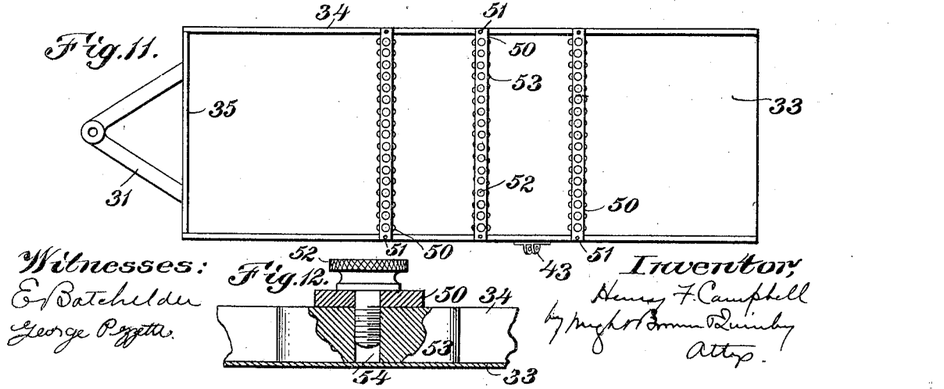
Fig. 11 is a top plan view of the tray, showing the arrangement of the distributers.
Fig. 12 is a sectional view of one of the shutters, taken on the line 12 12 of Fig. 10, showing the arrangement of one of the individual shutters by means of which it is adjusted and held in place.

50 represents plates, here shown as three, (see particularly Figs. 10 and 11,) said plates at their ends being secured by screws 51 to the flanges 34 of the tray. These plates 50, as shown, extend across the tray from side to side.

52 represents a series of thumb-screws arranged in suitable apertures in the plate 50.

Figure 1:
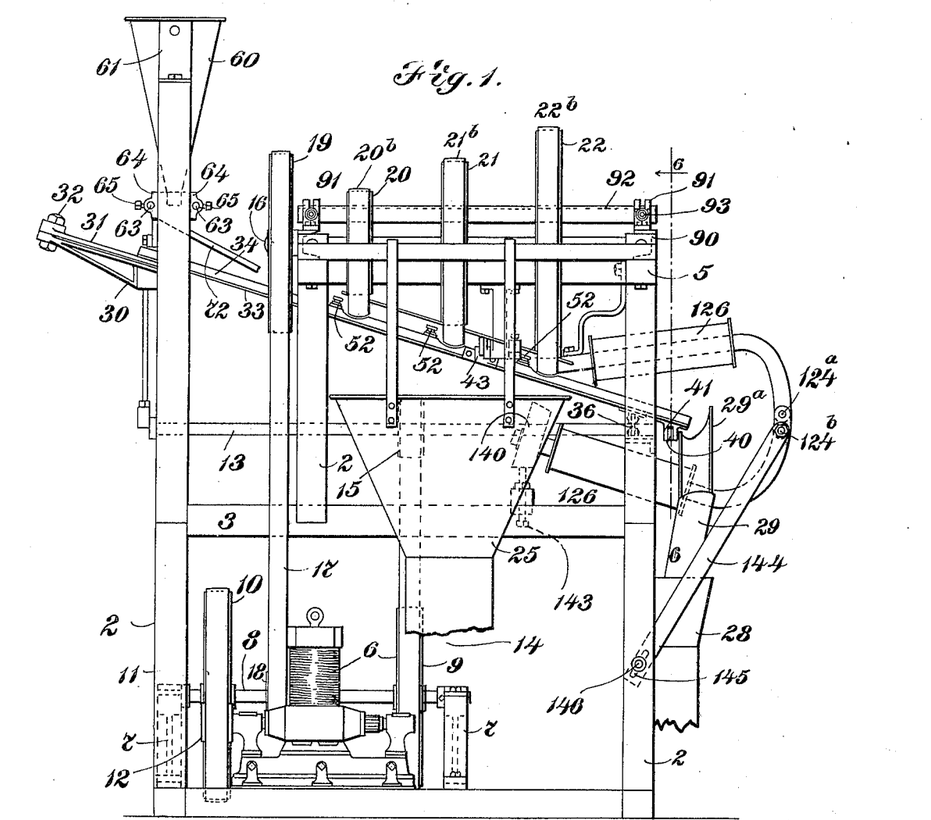
Figure 1 is a side elevation of an apparatus constructed in accordance with my invention, the feed or front end of the apparatus appearing at the left and the delivery or rear end of the apparatus appearing at the right.
Figure 2:
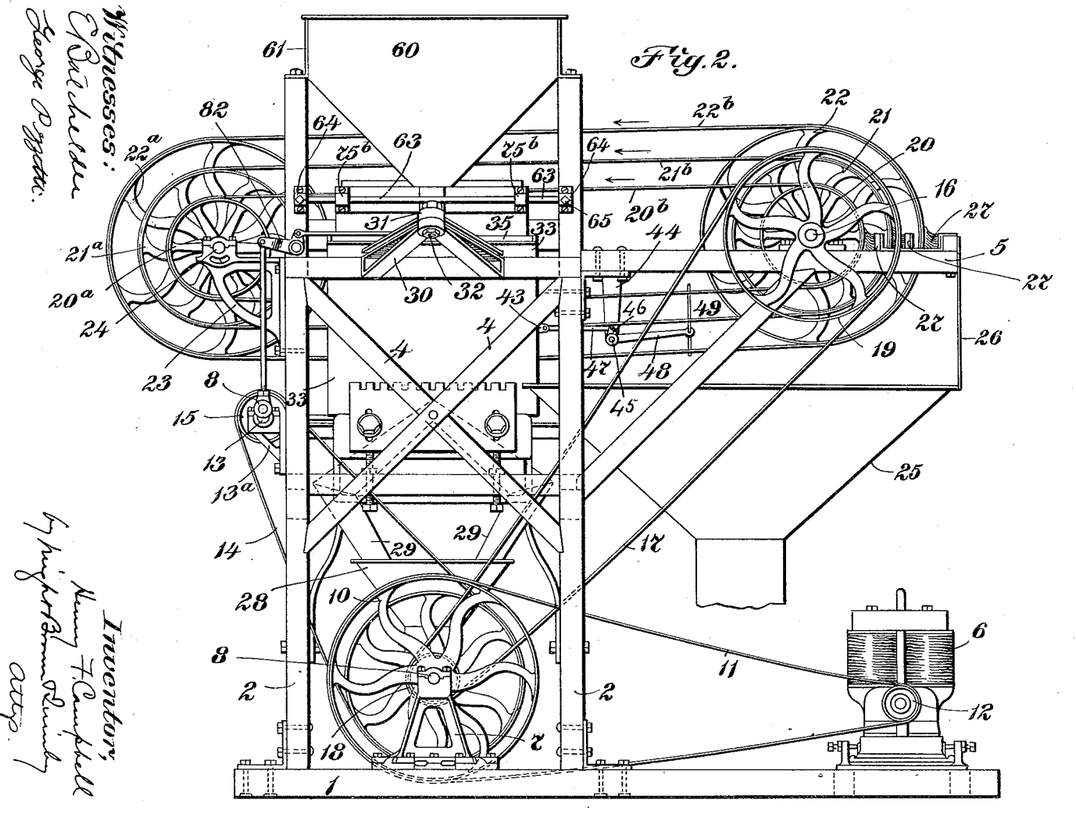
Fig. 2 represents a front end elevation of the apparatus.
Figure 3:
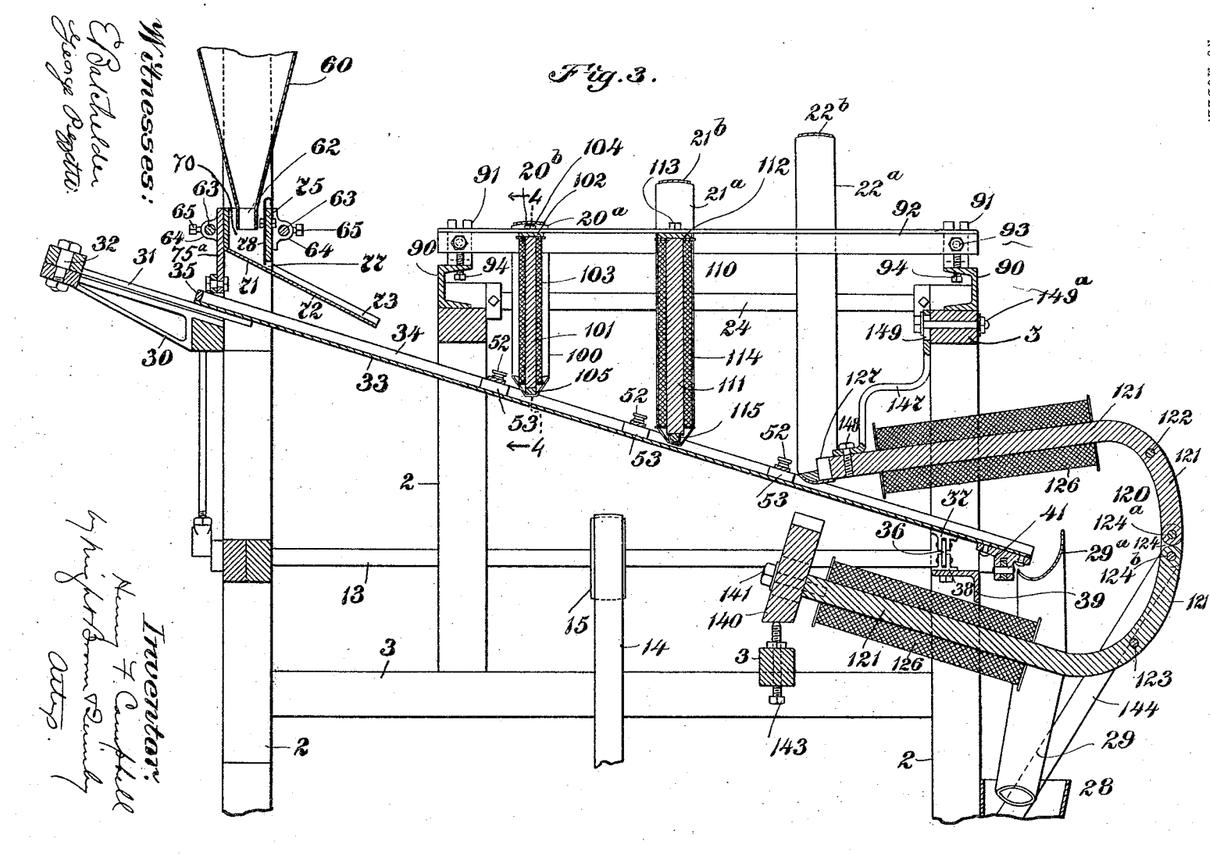
Figure 4:
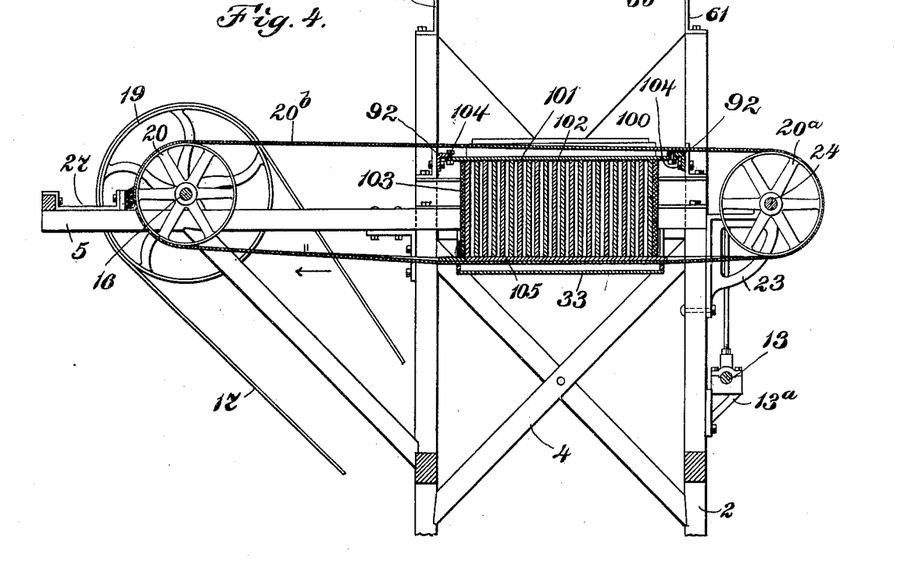
Fig. 4 represents a cross-sectional view of the apparatus on the line 4 4 of Fig. 3 looking in the direction of the arrow toward the front of the apparatus and showing the construction of the first magnet and the arrangement of said magnet with respect to its carrier and the tray.
Figures 5, 6:
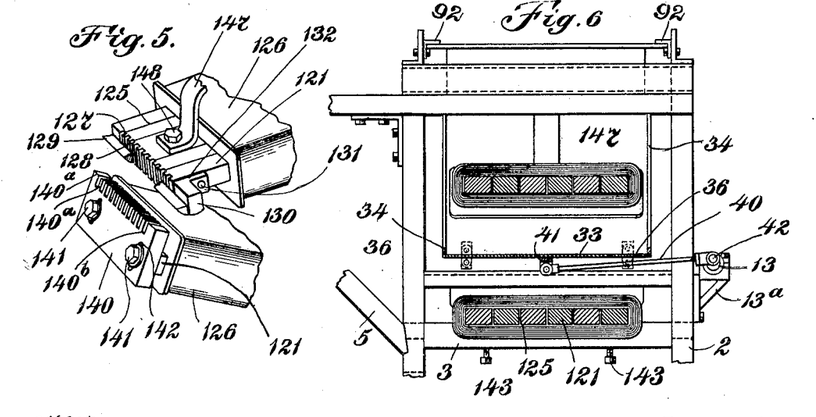
Fig. 5 is a detail perspective view of the horseshoe-magnet shown at the rear end of the apparatus in Fig. 3. In this view only the ends of the magnet appear, this view showing the staggered surface of the poles of the magnet and the arrangement of the diamagnetic shoe and insulated magnetic extension hereinafter described.
Fig. 6 is a cross-sectional view taken on the line 6 6 of Fig. 1 looking in the direction of the arrow toward the front of the apparatus and showing the relative arrangement of the laminæ of the horseshoe-magnet, the arrangement of the tray between the arms of the magnet, and the means by which the tray is supported and vibrated.

53 represents a series of shutters formed with screw-threaded apertures 54, adapted to be engaged by a thumb-screw 52. (See Fig. 12.) The arrangement is such that each individual shutter may be entirely opened, as in Fig. 10, or may be placed crosswise of the tray at any desired angle, and thereafter by turning the thumb-screw 52 said shutter may be locked in its adjusted position. By this arrangement the flow of material by the shutter or shutters at any given point may be impeded or facilitated, as desired. The plate 50, with it shutters 53, constitute what I term a "distributer," there being three of these devices arranged one below the other, as shown in Figs. 1 and 3, whereby I am able to regulate by said distributers at the said three different points the flow of material by said distributers.

60 represents a stationary hopper secured by suitable brackets 61 at the top of the front standards 2. The hopper 60 at its lower end is formed with a spout 62, that is positioned within and arranged to discharge into a box 70 of the distributer hereinafter described.

63 represents a rod secured at its ends in brackets 64, carried by the uprights 2, there being two rods, one on the front and the other on the rear side of the front uprights. (See Figs. 1, 3, and 8.) Set-screws 65 prevent the slipping of the rods from the brackets 64.

70 represents a box. The bottom of the box is inclined, as shown, and extends toward the rear of the apparatus over the tray 33 as an apron 72.

73 represents side flanges upon the bottom of the apron, having inturned lips 74. The rear side of the box 75 has its lower edge notched to form fingers 76 and alternating openings 77. The flanges 74 take into complemental grooves in the end of the piece 75.

78 represents a slide or gate arranged on the inside of the side 75 and adjusted toward and from the bottom 71. Screws 79 are employed to maintain the slide or gate 78 in any desired position of adjustment, whereby the openings 77 between the fingers 76 may be restricted or partially closed by the gate, as desired. Upon the rear side 75 of the box 70 and upon the front side 75$^a$ of said box are secured lugs 75$^b$, that are arranged and adapted to slide on the rod 63.

80 represents a lug secured to the front side 75$^a$ of the box.

81 represents a crank secured to the front end of the shaft 13. (See Fig. 8.)

82 represents a bell-crank mounted upon one of the uprights 2. (See Figs. 2 and 8.)

83 represents a pitman connected at one end to the crank 81 and at its other end to one of the arms of the bell-crank 82.

84 represents a pitman connected at one end to the other arm of the bell-crank 82 and at its opposite end to the lug 80. The arrangement is such that by rotation of the shaft 13 the box 70, with its bottom 71 and apron 72, is reciprocated back and forth under the spout 62 and over the tray 33.

90 represents cross-pieces carried by the uprights 2 and extending over the tray. (See Fig. 3.) Upon each end of these cross-pieces and upon opposite sides of the framework are arranged slotted lugs 91.

92 represents a bar, there being one on each side of the apparatus. A bolt 93 passes through the bar at either end and is arranged in the slot of the lug 91, whereby the bar may be positively bolted and secured in any desired vertical adjustment.

94 represents adjusting-screws passing up through the cross-pieces 90 and engaging the under side of the bars 92. By loosening the bolts 93 and turning the adjusting-screws 94 the bars 92 may be moved up or down to any desired position and then locked in place. By this construction the two upper magnets, hereinafter described, that are carried by the bars 92 can be adjusted toward and from the tray and its contents.

100 (see Figs. 3 and 7) represents the upper or first magnet. This is composed of a series of bars 101, of magnetic material, rectangular in cross-section and spaced from one another. These bars at their upper ends are secured in any preferred way to a plate 102, of magnetic material, the bars 101 and the plate 102 constituting, respectively, the cores and keeper of a compound magnet.

103 represents the spool surrounding the cores. The plate 102 is secured by bolts 104 to a flange on the bars 92. (See Fig. 3.) The magnet 110 and the magnet 100 have the same general construction and arrangement; but the bars constituting the cores of the two magnets differ in cross-section, length, and spacing.

105 represents a thin plate, of brass or other diamagnetic material, secured in any desired way to the lower ends of the cores 101. The arrangement is such that the plate 105 bears indirectly upon and slightly depresses the carrier 20$^b$.

The second magnet 110 (see Fig. 3) is composed of a series of rectangular-shaped bars 111, of magnetic material. These bars at their upper end are secured in any desired way to a plate 112, of magnetic material, the ends of said plate being secured by bolts 113 to the flanges of the bars 92 in the manner in which the plate 102 is secured.

114 represents a spool surrounding the cores 111.

115 represents a thin plate, of brass or other diamagnetic material, secured at the lower ends of the bars 111. This plate is arranged over and bears directly upon the carrier 21$^b$, slightly depressing the latter. The plates 105 and 115 constitute shoes to prevent the wear of the carrier by the cores 101 and 111 of the magnets 100 and 110, that are, as stated, rectangular in shape and spaced from one another. The cores 101 are shorter and smaller in cross-section than the cores 111, thus making the magnet 110 stronger than the magnet 100. Inasmuch as said cores of each magnet are spaced apart and have no keeper at their lower ends to distribute or equalize in a measure the magnetic action, these magnets when vitalized will form beneath the ends of the cores zones of magnetic potentiality of greater intensity than the zones situated beneath and below the spaces between the cores. The relative intensity of these varying zones depends upon the size and length of the core-pieces. In practice the spaces between the core-pieces are substantially the same as the corresponding width of the core-pieces employed, and enough core-pieces are used in order to have the magnet of this construction of sufficient width to extend the entire width of the tray.

120 represents a horseshoe-magnet. This, as shown, constitutes the third and last magnet of the series. This magnet (see Figs. 3, 5, and 6) is composed of a series of rectangular-shaped bars 121, of magnetic material, each having the linear shape of half a horseshoe. The bars 121 of the upper arm of the magnet are fastened together by a pin 122. The bars 121, forming the lower arm of the magnet, are in like manner fastened together by a pin 123. The bars 121, forming the upper arm of the magnet, are hinged at their rear ends to the rear ends of the arms 121, forming the lower arm of the magnet, by a link or links 124, pivoted at one end to a pin 124$^a$, which passes through the ends of the bars 121 of the upper arm. At its other end this link is pivoted upon a pin 124$^b$, arranged in the ends of the bars 121 of the lower arm of the magnet. The bars 121 are arranged out of contact with one another in order to form intervening insulating cooling air-spaces 125, except for a short distance at the ends of the bars, where they are in contact. Each arm of this magnet is provided with a spool 126, by which the magnet is vitalized in the usual way. The ends of the bars 122, forming the upper arm of the magnet, are recessed to form fingers 127 and alternating recesses 128, (see Fig. 5,) the said fingers corresponding to the free ends of the bars 111 and the said recesses 128 corresponding to the spaces between the lower ends of said bars 111 or 101.

129 represents a thin strip of brass or other diamagnetic material secured to the ends of the bars 121 of the upper arm of the magnet over the fingers 127 or a portion thereof. This strip of brass 129 corresponds to the strip 115 of the magnet 110 and the strip 105 of the magnet 100, these strips or shoes being arranged as a surface to be engaged by the carriers to prevent abrasion of the latter.

130 represents an extension-piece. This is composed of magnetic material and secured to one of the bars 121 by a brass or other diamagnetic screw 131.

132 represents the insulating material between the extension 130 and the bar 121. A similar extension-piece 105$^a$ is secured to the bar or core-piece 101 nearest the hopper 25 on the right-hand side of the apparatus looking from the front to the rear. The extension 105$^a$ is in like manner insulated from the core-piece 101. (See Fig. 13.) The magnet 110 is in like manner provided with an insulated extension-piece, and the extension-pieces of each of the magnets are arranged upon that side of the apparatus next and over the hopper 25.

140 represents a keeper secured at the free ends of the bars 121, constituting the lower arm of the horseshoe-magnet. Bolts 141, passing through slots 142 in the keeper, enter suitable recesses in the ends of the bars 121 and furnish means whereby not only the keeper is maintained in place, but may also be adjusted up and down. The face of the keeper 140 next the carrier is recessed to form projections 140$^a$ and alternating spaces 140$^b$. The fingers 140$^a$ and recesses 140$^b$ correspond in function to the fingers 127 and recesses 128.

143 (see Figs. 3 and 6) represents set-screws supported and carried by the cross-pieces 3. These set-screws are arranged to engage the lower edge of the keeper 140 and furnish means whereby the keeper 140 may be adjusted toward and from the tray.

144 represents struts, here shown as two. (See Figs. 1 and 3.) These struts at their upper ends are pivoted on the pin 124$^b$ of the horseshoe-magnet. These struts at their lower ends are formed with slots 145, in which are engaged bolts 146, by which the struts may be adjusted up and down and maintained in adjusted position. By this construction the rear end of the magnet may be adjusted up or down, as desired.

147 represents an arm. (See Figs. 3 and 5.) This arm at its lower end is secured to one of the bars 121 of the upper arm of the horseshoe-magnet by a bolt 148. This arm at its upper end is formed with a slot 149, through which passes a bolt 149$^a$, carried by one of the cross-pieces 3 at the rear end of the apparatus over the tray. By means of the arm 147 and its slotted connection with the bolt 149 the end of the magnet over the tray may be adjusted toward and from the tray, if desired, and then secured in its adjusted position by loosening and tightening the bolt 149$^a$, as will be clearly understood. From an inspection of Fig. 3 it will be seen that the magnets 100 and 110 may be adjusted toward and from the tray or the material thereon by means of the adjustment of the bar 92. The horseshoe-magnet 120 may likewise have its poles individually adjusted toward and from the tray and the material carried thereon, while at the same time, by means of the struts 144, the magnet may be bodily adjusted up and down in a vertical direction or to the right and left in Fig. 3, or, in other words, up and down the tray, if desired.

The operation of my improved apparatus is as follows: Referring to Fig. 3, upon starting the apparatus the ore, either pulverized or in otherwise suitable condition, is placed in the hopper 60 and falls therefrom into the agitator. If the machine were stationary, the ore between the bottom 71 of the agitator and the mouth of the spout 62 would act as a plug or stopper and prevent the admission of further material until said plug were moved sidewise to clear the mouth of the hopper. The reciprocation of the agitator automatically admits a predetermined amount of material into the agitator, distributes the admitted material in front of the gate 78 to admit of its passage through the openings 77, the material passing down the apron 73 and dropping onto the tray 33. The motion of the agitator not only feeds and distributes the material, but also jars asunder any bunches or particles, the result being that the ore is shaken out upon the apron 72 in a thin even film of predetermined depth and extending the entire width of the apron, which in turn shatters and distributes upon the tray a thin even film the entire width of the tray. The tray 33 is vibrated laterally about its pivot 32, this vibration not only serving to cause the material to descend down the tray to and by the magnets, but also to distribute the ore over the bottom of the tray and by the violent agitation of the material to jar asunder any bunches or masses of particles, so that the material as it approaches the magnetic field of each of the magnets is substantially all granulated and the magnetic particles mechanically separated from the nonmagnetic particles. The vibration of the tray further serves to sway and shake the tresses of material lifted by the magnets during their passage up to the carriers and their transit across the tray, the result of which is to shake out from the tress or collection of material lifted and transported any mechanically adhering particles of non-magnetic material. The agitation of the particles enables them to respond freely to the influence of the magnetic field. It causes them to become polarized before they arrive under the magnet, and thereby the most strongly magnetic face of each particle is turned toward the magnet before it arrives beneath it. Each particle is thus presented to the magnet in a position to be acted upon most strongly. This agitation is accomplished by a slight and rapid lateral vibration of the tray, and it is obvious that the motion thus imparted to the particles in addition to and other than the mere feed movement or travel toward the magnet will conflict with such feed movement and cause the particles to be thrown about in various directions and perform the function of agitating the material. The vibration of both the agitator and the tray is at an angle to the line of feed. This agitation, in addition to the function already stated, serves also to destroy all cross windrows or reefs, such as would be formed by a reciprocation of the tray in the line of feed. The lateral vibration of the tray, however, has a tendency to form longitudinal reefs or windrows, depending somewhat upon the speed at which the machine is driven. To overcome this and to insure the material approaching the field of each magnet in an even film, I have provided the distributers heretofore described. If the material being operated upon shows any tendency to reef at a particular point in front of the distributer, the shutters 53 are adjusted to throw said excess to one side and cause it to pass the distributer at that point in a thin even film, such adjustment being continued until the film passing the distributer is even and uniform. The operation of one distributer is the same as that of all; there being one just in advance of the magnetic field of each magnet. The magnet 110 is of greater potentiality than the magnet 100, and the magnet 120 is of greater potentiality than the magnet 110, the purpose being to have the first magnet lift out of the mass of moving material the particles that are most susceptible to magnetic action. The second magnet in turn lifts out from the remaining mass the particles most susceptible to magnetic action, while the third and last magnet lifts out the remaining particles of magnetic material or particles containing a percentage of magnetic material. The extent to which the last magnet will remove such particles may be varied by adjusting the poles of the magnet and by increasing or diminishing the power of the magnet through the construction and arrangement of its core-pieces and through the current passing through the spools. By this arrangement the action of each magnet is not impeded by the presence of ultra-susceptible magnetic material. If only one magnet were employed, the particles most susceptible to magnetic action would be first attracted to the belt or carrier and would so load it down as to interfere with the action of the magnet upon the particles less susceptible to magnetic action. As the material comes into the field of the magnet 100 the magnetic particles that are most susceptible to magnetic action are lifted to the carrier 26, and thereby transported to the right in Fig. 2 and dropped into the hopper 25, as hereinafter explained. The material as it is transported by the carrier successively enters and leaves zones of different intensity by reason of the spaced arrangement of the core-pieces 101. This results in the agitation of the material toward and away from the carrier during its transportation by the latter. Further, the material transported by the carrier is also shaken by the tray. The action of the tray and the magnet is to shatter and break up masses containing magnetic material and non-magnetic material and to shake out of the transported mass particles of non-magnetic material. As the material leaves the magnet 100 it comes under the influence of the extension-piece 105, which has sufficient potentiality to keep the material in engagement with the carrier until it has gone past the extension, and thus drops into the hopper 25. The moving stream of ore after it passes the magnet 100 approaches the field of the magnet 111, which in like manner takes out the particles of magnetic material which the potentiality of the magnet 100 will not affect. The material is lifted and transported and delivered by the magnet 110 under the same conditions as described in connection with the magnet 100. Further, it will be observed that by the means provided the magnets 100 and 110 may be adjusted toward and from the material in order to increase and diminish their effective potentiality as desired. After the film of material has passed the magnet 110 it approaches the field of the magnet 120. This magnet is of relatively great potentiality and, as stated, may be adjusted to extract from the remaining mass of ore the particles of magnetic material or particles containing certain percentages of magnetic material to practically any desired extent, depending on the adjustment, construction, and power of the magnet. As the material is lifted to the carrier $22^b$ of the magnet 120 it passes through the successive zones of varying intensity, such zones being of relatively excessive potentiality compared with the potentiality of the zones of the other magnets. This results in the material, as in the other magnets, being successively dropped by the carrier and snapped back against the same, but with greater force. The material as it is transported by the carrier is further subjected to the shaking and swaying action due to the vibration of the tray, so that the material as finally delivered into the hopper is substantially free from mechanically-adhering particles of non-magnetic material.

It will be seen that from the moment the material leaves the spout 62 until after it passes the extension-piece 130 of the magnet 120 it is subjected to a continuous and violent agitation and swaying, such agitation serving not only to feed the material down toward the magnets, to distribute the pulp over the bottom of the apron 72 and tray 33, and also to mechanically jar asunder and shatter any mass or masses of the material, so that their magnetic particles may be separated from the non-magnetic particles and the material distributed in a thin even granulated film over the entire width of the tray, particularly in the immediate fields of the magnets. This permits the utilization of the apparatus to its entire capacity and prevents, in addition to what has been set forth, bunches of material approaching the field of the magnet, in which case the magnet would only be able to affect the surface, and the material beneath the surface, although magnetic, would have a tendency to remain upon the tray. The first set of magnets lifts out and the carrier removes the particles that are most susceptible to magnetic action, the second magnet removes the particles that are less susceptible, and the remaining set or sets of magnets remove the remaining particles of magnetic material. These magnets and their carriers further pick up masses containing magnetic particles, smash said masses to pieces, and, together with the action of the tray, shake out the non-magnetic particles, the latter falling back upon the tray and passing from the end of the tray into the spout $29^a$. (See Figs. 1 and 3.) Further, by the distribution of the work of the magnets I am enabled to obtain the full effect of the magnets the entire width of the tray. As stated, if but one magnet or set of magnets were employed it would be necessary to have it so powerful as to lift a relatively excessive amount to the carrier, especially in case of ore rich in ferruginous material. This amount when lifted to the carrier would occupy but a small portion of the width in the form of a tress. Said tresses when once formed would seriously interfere with the action of the magnet upon the magnetic particles not lifted and tend to drag along adhering diamagnetic particles. By my invention the potentiality of the series of magnets increases from the first to the last. While I have shown three sets of magnets, I do not wish to be limited to such arrangement, as I may employ two or three or more than three.

It will be seen that in the work of the magnets each succeeding magnet, by reason of the action of the prior magnet, does not have its action interfered with, because the prior magnet has lifted out of the mass the more magnetic parts of the material, thus leaving the subsequent magnet or magnets and their carriers unobstructed by the presence of material so magnetic as to be lifted upon the carrier in a ridge before the magnet could lift to the carrier less-magnetic particles. In all cases, whether two or three or more sets of magnets are employed, these magnets should all be adjustable toward and from the tray in order to accommodate the machine to the varying conditions of different classes of ore and the particular degree of separation desired at a particular point.

The above-described apparatus includes a stationary magnet, means for agitating a mass of ore below said magnet, and means for removing the particles lifted out by the magnet.

By means of my improved apparatus I am enabled to keep the mass of material in a constant lively state below the magnet, so that the particles are constantly dancing or moving about, but not moving past or away from the magnet at such speed as would tend to prevent the lifting out by the magnet of the magnetic particles, thus subjecting the material while in a tossed-up state to the field of force of the stationary magnet, which latter removes from the mass thoroughly all magnetic particles which are capable of being attracted by the particular magnet employed.

Figure 7:
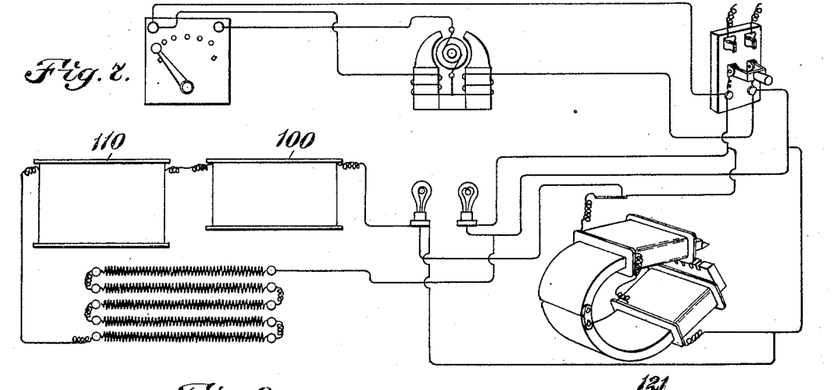
Fig. 7 is a diagrammatic view showing the circuits.

By reference to Figs. 1 and 3 it will be observed that the plurality of magnets have their poles at substantially equal distances above the conveyer or tray, and it will also be noted that the several magnets are of different sizes, progressively increasing in the direction toward which the ore passes over the conveyer. As shown in Fig. 7, these several magnets are connected in series, so that the single circuit imparts varying powers to the magnet, according to the size of the cores of the latter. In other words, the relative proportions of the magnets are such that they have different saturative powers and therefore enable the ore to be subjected to the gradually-increasing magnetic field forces, as hereinbefore described.

From an inspection of Fig. 3 it will be apparent that the magnets 100, 110, and 120 progressively increase in the order just referred to in cross-sectional area and saturative capacity and in the order in which the ore is subjected to the actions of the magnets. These magnets consequently produce magnetic zones of varied intensity.

While I have described the magnets as being of progressive graded saturative capacity and power, owing to the relative proportions of said magnets or the cross-sectional area of cores, I do not wish to be understood as limiting myself to such difference in cross-sectional area as the means for obtaining the difference in the saturative capacity of the magnets.

Having thus explained the nature of my said invention and described a way of constructing and using the same, although without having attempted to set forth all the forms in which it may be embodied or all the modes of its use, I declare that what I claim is—

1. The combination in a magnetic separator, of a magnet; means, presenting an unobstructed surface at a due distance below the magnet, for supporting and conveying the material under and past the magnet, and through an uninterrupted field of such magnet, and to pass it, spread in a film of substantially uniform thickness on the surface beneath the magnet, and means for causing the particles of ore to be mechanically agitated under the magnet in a direction other than that of the travel of the ore.

2. In a magnetic separator for ores, a magnet; a support for the material located beneath the magnet, means for causing a film of comminuted ore of substantially uniform thickness to travel forwardly over said support, and relatively to the same and for presenting the said ore to the action of the magnet while separated from the poles thereof by an intervening space, and means for causing the particles of ore to be mechanically agitated in various directions while so presented under the magnet.

3. The combination in a magnetic separator, of a magnet; means, presenting an unobstructed surface at a due distance below the magnet, for supporting and conveying the material spread in a film of substantially uniform thickness under and past the magnet, and through an uninterrupted field of such magnet, and means for imparting a transverse shaking movement to the said support.

4. In an apparatus of the character specified, a magnet, a conveyer under the magnet for carrying the material spread in a thin film through and past the field of the magnet, and means for vibrating said conveyer in a direction other than the direction of feed of the material while in the field of the magnet and in a plane substantially parallel with the plane of the film of material on said conveyer and at a due distance below the magnet.

5. In an apparatus of the character specified, a tray extending through and beyond the field of the magnet, means to feed the material upon said tray substantially its entire width, in a predetermined film, means for vibrating said tray in a direction other than the direction of feed of the material and in a plane substantially parallel with the plane of the film of material on said tray, and a magnet and carrier located at a due distance above the tray to lift magnetic particles and carry them aside.

6. In an apparatus of the character specified, a magnetic separating device arranged to remove magnetic particles from a mass of ore, a tray arranged to conduct the ore below the said device and within its field, said magnetic device having an interrupted pole-surface of varying intensity but of the same polarity to shake the particles or masses lifted by it to shatter from the magnetic particles non-magnetic particles, whereby the material removed by said device contains substantially no free non-magnetic particles.

7. In an apparatus of the character described, a tray or conveyer for ore, and a plurality of magnets having their poles at substantially equal distances above said conveyer, said magnets being of progressive graded saturative capacity and power.

8. In an apparatus of the character described, a tray or conveyer for ore, and a plurality of electromagnets having their poles at substantially equal distances above said conveyer, the cross-sections of the core-pieces of said magnets increasing progressively, whereby they are adapted to exert progressively intense action upon the ore without varying their distance from the ore.

9. In an apparatus of the character described, a tray or conveyer for ore, and a plurality of magnets each constructed to generate zones of magnetic force of varying intensity but of common polarity in proximity to said tray, said varying zones being arranged in a line other than the direction of feed of material.

10. In an apparatus of the character described, the combination with a tray or conveyer for ore, of a horseshoe-magnet having its poles on opposite sides of the tray, with pole-pieces of essentially the same cross-section as the shanks of said magnets and arranged to lift the magnetic particles from the conveyer, the upper pole-pieces being nearer the tray or conveyer than the lower pole-pieces.

11. In an apparatus of the character described, the combination of a tray or conveyer for ore, of a horseshoe-magnet having its poles on opposite sides of the tray, and means for independently adjusting the poles of said magnet toward and from the tray.

12. The combination in a magnetic separator of a magnet, a support for the material located beneath the magnet, said support being composed of a non-oxidizable, non-magnetic substance, means for causing a film of comminuted ore of substantially uniform thickness to travel over said support, and relatively to the same, and for presenting said ore to the action of the magnet while separated from the poles thereof by an intervening space, and means for causing the particles of ore to be mechanically agitated in a direction other than that of the travel of the ore while so presented under the magnet.

13. The combination in a magnetic separator of a magnet, a support for the material located beneath the magnet, said support being composed of aluminium, means for causing a film of comminuted ore of substantially uniform thickness to travel over said support, and relatively to the same, and for presenting said ore to the action of the magnet while separated from the poles thereof by an intervening space, and means for causing the particles of ore to be mechanically agitated in various directions while so presented under the magnet.

14. In a magnetic ore-separator the combination of a magnet, a support for the material located beneath the magnet, a shaker located above said support for thinly distributing the material thereon, and a hopper arranged above said shaker provided with means for delivering the material therefrom upon the floor of said shaker, and means for causing the particles of ore to be mechanically agitated in various directions under the magnet while separated therefrom by an intervening space.

15. In a magnetic ore-separator, a vibrating shaker, a hopper arranged above the same and provided with a pipe terminating near the floor of the shaker, a support for the material below the shaker, a magnet above said support and means for causing the particles of ore to be mechanically agitated in various directions under the magnet while separated therefrom by an intervening space.

In testimony whereof I have affixed my signature in presence of two witnesses.

HENRY F. CAMPBELL.

Witnesses:
C. F. BROWN,
E. BATCHELDER.